US008061891B2

(12) United States Patent
Lin et al.

(10) Patent No.: US 8,061,891 B2
(45) Date of Patent: Nov. 22, 2011

(54) ADHESIVE THERMOMETER

(76) Inventors: Youn-Jan Lin, Taichung (TW);
Su-Ching Lin, Taichung (TW)

( * ) Notice: Subject to any disclaimer, the term of this patent is extended or adjusted under 35 U.S.C. 154(b) by 452 days.

(21) Appl. No.: 12/292,484

(22) Filed: Nov. 20, 2008

(65) Prior Publication Data

US 2009/0141773 A1 Jun. 4, 2009

(30) Foreign Application Priority Data

Nov. 29, 2007 (TW) ............................ 96145417 A
Jul. 24, 2008 (TW) ............................ 97128185 A

(51) Int. Cl.
*G01K 1/12* (2006.01)

(52) U.S. Cl. ......... 374/100; 374/141; 116/216; 600/549

(58) Field of Classification Search ................. 374/100, 374/141, 208, 163, 183, 185, 150, 151, 149, 374/147, 161, 162, 101, 102, 103, 186; 73/866.5; 600/549, 474; 116/216
See application file for complete search history.

(56) References Cited

U.S. PATENT DOCUMENTS

| | | | | |
|---|---|---|---|---|
| 3,208,283 A | * | 9/1965 | Kravitz | 600/549 |
| 3,605,498 A | * | 9/1971 | Lamb | 374/198 |
| 3,674,176 A | * | 7/1972 | Sagi | 221/135 |
| 4,030,482 A | * | 6/1977 | Navato | 374/162 |
| 4,509,533 A | * | 4/1985 | Chervitz | 600/549 |
| 4,524,778 A | * | 6/1985 | Brown et al. | 600/549 |
| 4,987,579 A | * | 1/1991 | Yoshinaka et al. | 377/25 |
| 5,050,612 A | * | 9/1991 | Matsumura | 600/483 |
| 5,304,004 A | * | 4/1994 | Nunes | 374/208 |
| 5,401,100 A | * | 3/1995 | Thackston et al. | 374/208 |
| 5,738,442 A | * | 4/1998 | Paron et al. | 374/162 |
| 6,220,750 B1 | * | 4/2001 | Palti | 374/164 |
| 6,260,414 B1 | * | 7/2001 | Brown et al. | 73/295 |
| 6,626,837 B2 | * | 9/2003 | Muramatsu et al. | 600/459 |
| 6,814,706 B2 | * | 11/2004 | Barton et al. | 600/549 |
| 7,192,187 B2 | * | 3/2007 | Blichmann | 374/147 |
| 7,659,439 B2 | * | 2/2010 | Grossman | 602/57 |
| 7,665,893 B2 | * | 2/2010 | Buchalter | 374/158 |
| 2002/0017997 A1 | * | 2/2002 | Felkowitz | 340/573.1 |
| 2002/0087082 A1 | * | 7/2002 | Muramatsu et al. | 600/459 |
| 2002/0110179 A1 | * | 8/2002 | LeTourneau | 374/141 |
| 2003/0014025 A1 | * | 1/2003 | Allen et al. | 604/361 |
| 2003/0072687 A1 | * | 4/2003 | Nehring et al. | 422/102 |

(Continued)

FOREIGN PATENT DOCUMENTS

CN    101294853 A   * 10/2008

(Continued)

*Primary Examiner* — Gail Verbitsky
(74) *Attorney, Agent, or Firm* — Bacon & Thomas, PLLC

(57) ABSTRACT

This invention is to provide an adhesive thermometer, comprising: a sense unit, a display unit and an attachment unit, where the display unit and the sense unit are combined into a rectangular parallelepiped, and the display unit is located at the top while the sense unit at the bottom. The attachment unit is formed by an adhesive pad and the rectangular parallelepiped, which makes the sense unit to be disposed for exposing downward. The bottom of the adhesive pad is provided with gluey substance, and a protective pad is stuck to the gluey substance for temporary attachment. When using, simply tear down the protective pad and stick the thermometer to both ends of a measured location by means of the exposed gluey substance, and adhere the sense unit to the measured location to sense the temperature, followed by exhibiting the sensed temperature at the display unit in terms of different message types: numeral, color, sound or odor.

8 Claims, 6 Drawing Sheets

U.S. PATENT DOCUMENTS

| | | | |
|---|---|---|---|
| 2005/0094703 A1* | 5/2005 | McConnell et al. | 374/101 |
| 2005/0178314 A1* | 8/2005 | McGuire | 116/216 |
| 2007/0098148 A1* | 5/2007 | Sherman | 379/452 |
| 2007/0206655 A1* | 9/2007 | Haslett et al. | 374/141 |
| 2008/0167535 A1* | 7/2008 | Stivoric et al. | 600/301 |
| 2009/0030289 A1* | 1/2009 | Katayama et al. | 600/301 |

FOREIGN PATENT DOCUMENTS

| | | | |
|---|---|---|---|
| GB | 2411644 A | * | 9/2005 |
| JP | 09126905 A | * | 5/1997 |
| JP | 2003329517 A | * | 11/2003 |
| WO | WO 2010098040 A1 | * | 9/2010 |

* cited by examiner

ADHESIVE THERMOMETER

BACKGROUND OF THE INVENTION

1. Field of the Invention

The present invention relates to adhesive thermometers, more specifically, to one capable of being stuck to the sensed position by the adhesive pad of the attachment unit, sensing the temperature by the sense unit, and exhibiting the sensed temperature at the display unit in terms of different message types: numeral, color, sound or odor.

2. Description of the Prior Art

As regards the drawbacks of the traditional mercury thermometers, electronic thermometers have gained their popularity because of the following well-known advantages: highly assured safety, short measuring time and handy viewing readout. Conventional electronic thermometers appear in various outlooks, for instance, FIG. 1 shows a popularly seen electronic thermometer 6, where its front is provided with a sense unit 61, which is placed in some portions of the human body (mouth, armpit or anus) of the measured individual, to sense the temperature, and the sensed temperature is read out from the display unit 62 located outside the human body. FIG. 2 shows an electronic thermometer 7 also named ear thermometer, where its cone-shaped sense unit 71 is inserted into the ear of the measured individual for the sense of the temperature, and the readout is shown in its display unit 72. Aside from the aforementioned two electronic thermometers, there are quite many different types, for instance, for some organizations or places (kindergartens, schools or department stores) that are prone to contagious diseases, a forehead thermometer is being used to aim at the forehead of someone entering to scan and induce the body temperature within a short distance, which enables a selection of potential fevered persons of temperature over 37.5° C., for further affirmation or elimination, the said infrared forehead thermometer is categorized as an electronic thermometer.

The prior art electronic thermometers nowadays (for instance the aforesaid three types) have a common flaw, which is unable to attach to the surface of a measured individual or article for showing the temperature at any time, only for single measurement of the temperature, where every use calls for a repeat of a like procedure (repeat for reset, repeat for the approach of the measured target, and repeat for the hold of the thermometer). A demand of a using mode for showing temperature at any moment, which could only be achievable by the sophisticated monitoring system of some medical organizations, where all the aforesaid prior art electronic thermometers are not available for the requirement; therefore, a thermometer of a novel structural combination is absolutely needed to be invented to meet such usage. It is worth further noting that the using mode of the thermometer that can stick to the measured individual for showing the body temperature at any time is most demanded by the parents of young and small children. Since young and small children will occasionally be sick, which definitely requires some time (a couple of days) to rest for earlier recovery; at the moment, their parents, attended to them day and night, have to measure their temperature repeatedly, to know if they are getting better. Such efforts for the parents that have already looked after their sick children for long are really awful fatigues for them. The inventor realized the suffering of the parents deeply, which hence motivated him in initiating the idea of the invention, for offering a thermometer that features sticking to the measured individual, for showing the body temperature directly; moreover, it can further show the temperature in sound through a sound generator, for providing the caretaker a better control over the measured temperature for action. In the same measure, this thermometer can also be applied to the measured location of an article or a place once the temperature is demanded for observation at any time.

SUMMARY OF THE INVENTION

In the light of the foregoing drawbacks, the inventor realized the situation and pushed hardly ahead with his research and design, and after a long time endeavor eventually gave birth to the present invention.

The objective of the present invention is to provide an adhesive thermometer that is capable of being stuck to the sensed position of an individual or an article, where the temperature is measured and exhibited in terms of different message types: numeral, color, sound or smell.

To achieve the above objective, this invention is a design of an adhesive thermometer, comprising: a sense unit, for sensing the temperature of the measured location; a display unit, for showing the temperature measured by the sense unit, and the display unit and the sense unit are joined into a thin rectangular parallelepiped; and an attachment unit, for integrating with the rectangular parallelepiped, where the sense unit is located at the bottom while the display unit at the top. The attachment unit is provided with an adhesive pad. Once the adhesive pad is combined with the rectangular parallelepiped, the sense unit is disposed for exposure downward, and the bottom of the adhesive pad is provided with gluey substance, which is for sticking on both sides of the measured location, and the sense unit is seamlessly contacted with the measured location.

In this invention, the edge of the bottom side of the sense unit is indented to form a joining fringe, and the adhesive pad of the attachment unit is provided with an opening, where the top edge along the opening has the gluey substance, which is for having the joining fringe of the sense unit adhere to the top edge along the opening on the adhesive pad, where the sense unit is exposed downward through the opening.

In this invention, the adhesive pad is provided with a protective pad, which is to prevent the gluey substance from exposure to the air, and the removal of the protective pad is needed when using.

In this invention, the protective pad is a single piece, which is stuck at the bottom side of the adhesive pad and the sense unit.

In this invention, the protective pad is made of two pieces, which are stuck at the both ends of the bottom side of the adhesive pad and crossed over below the bottom side of the sense unit.

In this invention, the protective pad is made of multiple pieces, which are stuck at the bottom side of the adhesive pad and the sense unit.

In this invention, the display unit is provided with a display screen which shows the temperature sensed by the sense unit in terms of numerals and/or states.

In this invention, the display unit is provided with a sound generator which generates sound to represent the temperature sensed by the sense unit.

In this invention, the display unit is provided with an odor diffuser which diffuses odor to represent the temperature sensed by the sense unit.

DETAILED DESCRIPTION OF THE INVENTION

To achieve the foregoing objects of the present invention, the techniques adopted and the achievable functioning are detailed described with reference to the following preferred exemplified embodiments and the accompanying drawings, which helps a thorough comprehension of the present invention.

Figure 1:
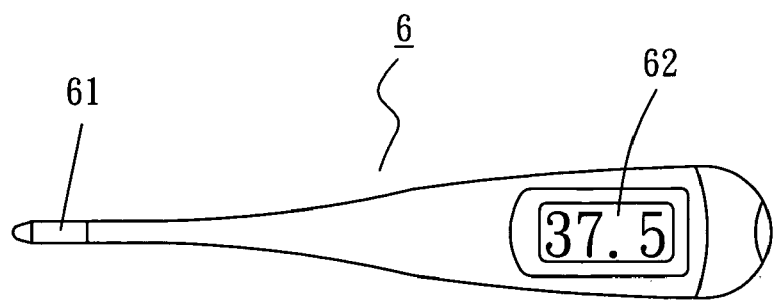
FIG. 1 is a front view of the first prior art electronic thermometer.
Figure 2:
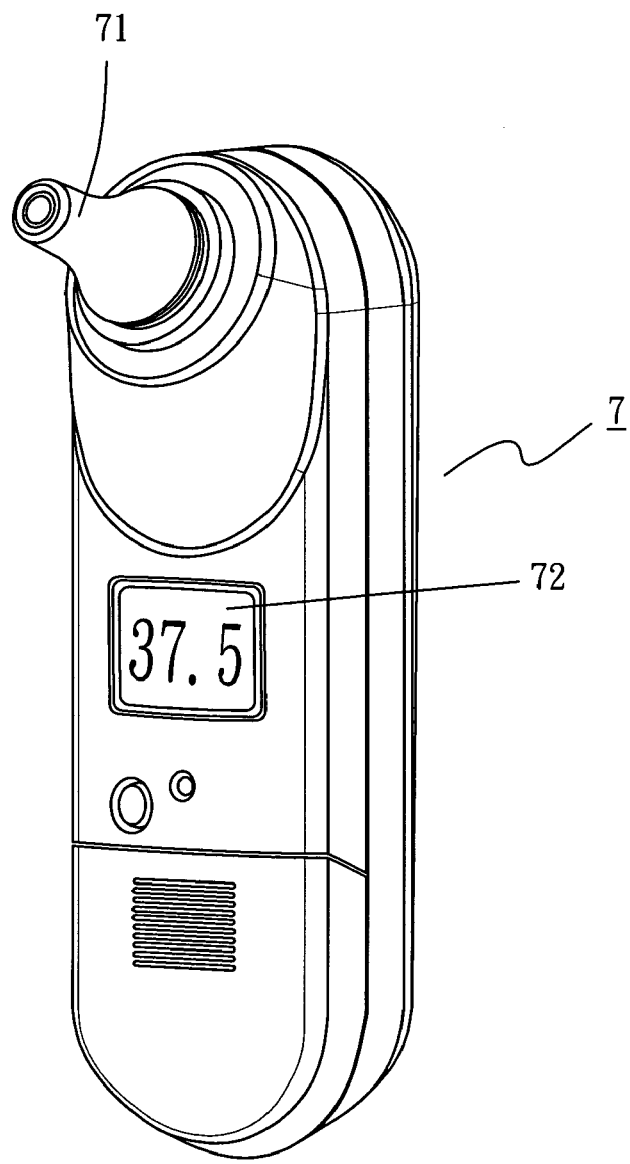
FIG. 2 is a three-dimensional view of the second prior art electronic thermometer.
Figure 3:
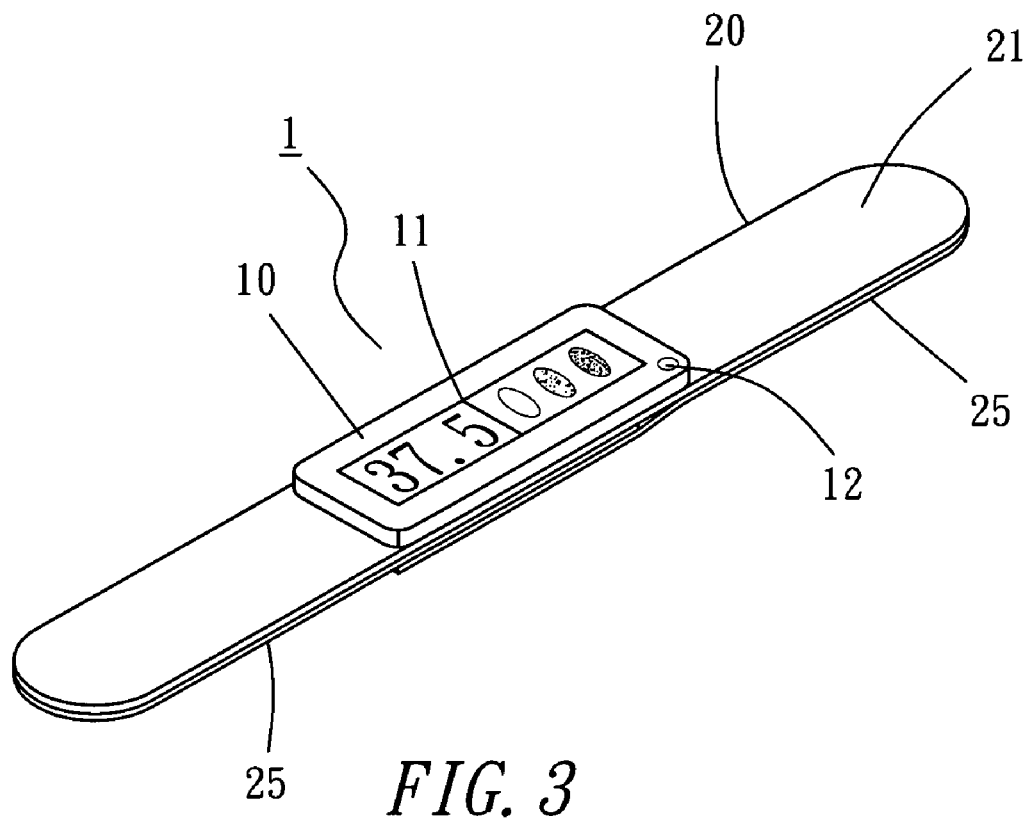
FIG. 3 is a three-dimensional view of the first exemplified embodiment of the present invention.
Figure 6:
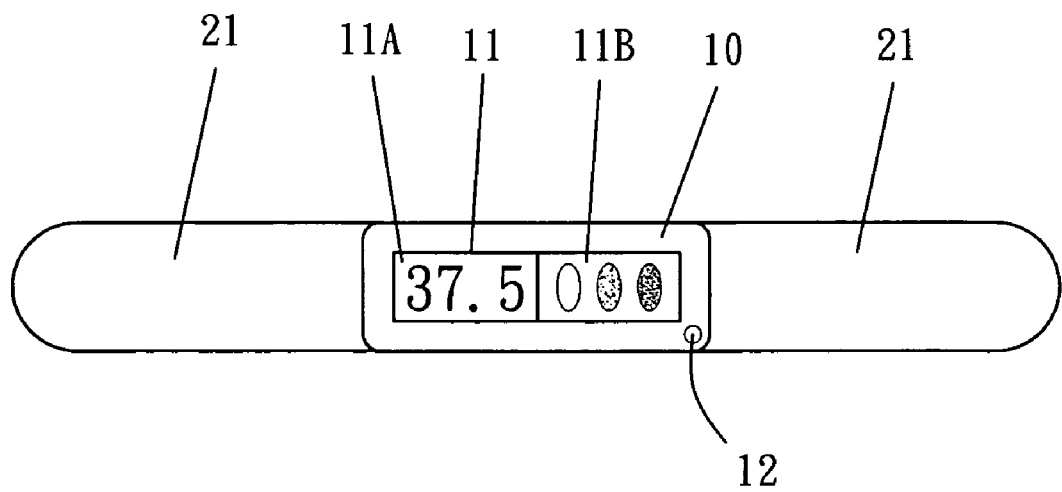
FIG. 6 is a top view of the first exemplified embodiment of the present invention.
Figure 4:
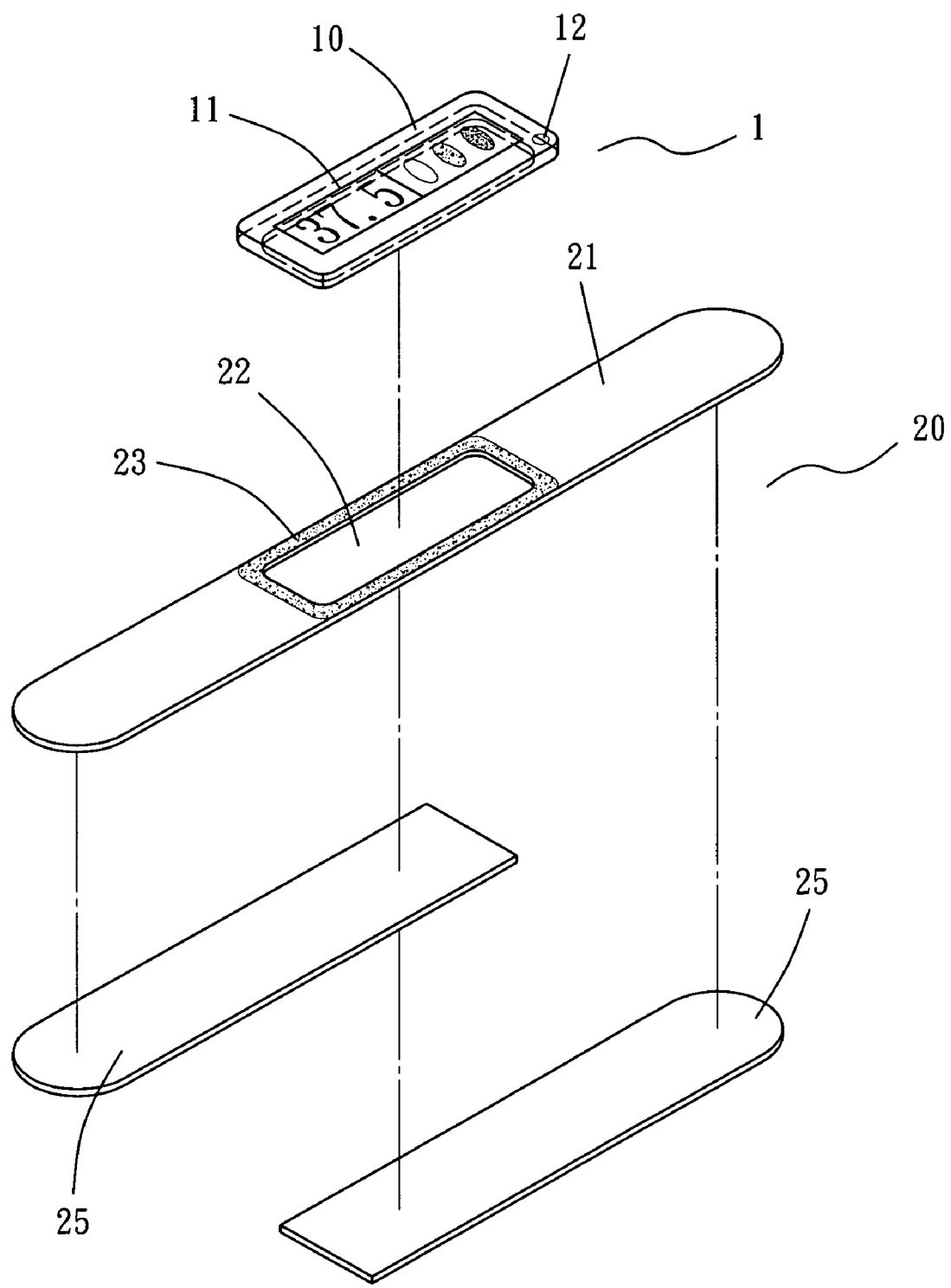
FIG. 4 is a three-dimensional exploded top view of the first exemplified embodiment of the present invention.
Figure 5:
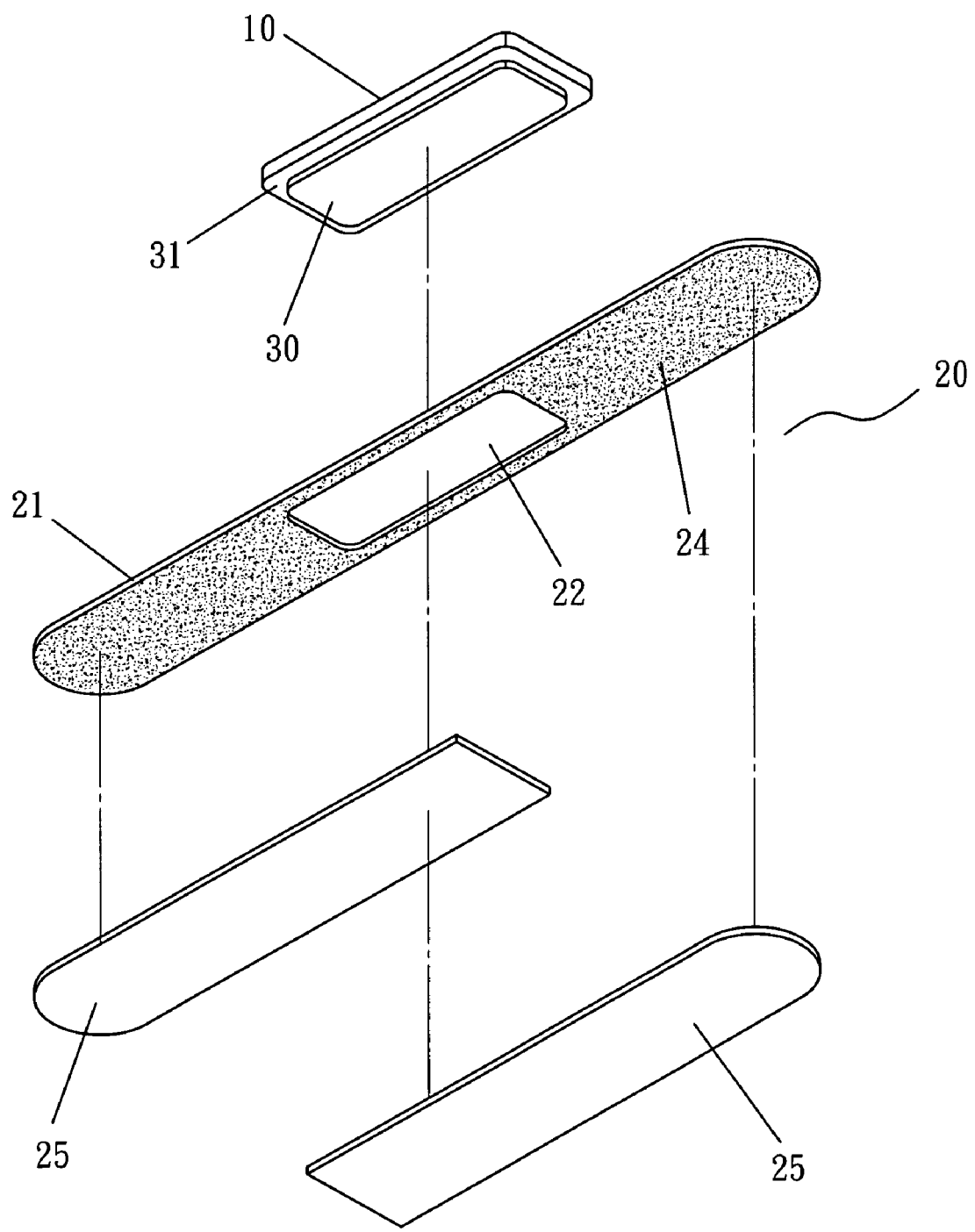
FIG. 5 is a three-dimensional exploded bottom view of the first exemplified embodiment of the present invention.

Referring to FIGS. 3-7, the first exemplified embodiment of the present invention as a whole is an adhesive thermometer 1, comprising a display unit 10, an attachment unit 20 and a sense unit 30, where the display unit 10 and the sense unit 30 are joined into a rectangular parallelepiped, and the display unit 10 is located on the top of the rectangular parallelepiped, which actually is a display screen 11 on top of the rectangular parallelepiped, and a switch 12 (preferred to be a thin-film switch); the sense unit 30 is located at the bottom of the rectangular parallelepiped, where its edge of the bottom side is indented to form a joining fringe 31 (shown in FIG. 5); its bottom side is the sensing surface of the sense unit 30, once the sensing surface is stuck to a measured individual (human body) or a measured article, followed by a pressing on the switch 12 for the power-on, and the sense unit 30 then measures the temperature which is shown on the display screen 11 of the display unit 10. The display screen 11 is provided with a plurality of using modes, for instance, in FIGS. 3 & 6, within the left frame of the display screen 11, there is a numeral display screen 11A which shows temperature directly in numerals (36° C., 37° C., 38° C., 39° C. or 40° C. - - - etc.), while a status display screen 11B is located in the right frame of the display screen 11, which shows the temperature in terms of the status. FIGS. 3 & 6 shows the display screen 11 which has both using modes of a numeral display screen 11A and a status display screen 11B.

The status display screen 11B shows different temperatures in terms of different colors, for instance: a light green (light color) is shown for the temperature below 37° C., an orange yellow (medium color) is shown for the temperature between 37° C.~39° C., and a deep red (heavy color) is shown for the temperature over 39° C., which displays the degree of the measured temperature for the observer. The way that the status display screen 11B displays the status of the temperature could be shown in FIGS. 3 & 6, where the display screen 11B is partitioned into several display icons corresponding to different regions of temperatures, as the temperature reaches to some region, only the corresponding display icon lightens (the other display icons do not lighten), for the display of the temperature is in that region; it could also be realized by displaying different temperature by different color for the entire display screen 11B, to represent the temperature is in that region.

The display screen 11 could have other display modes or ways, for instance: by means of the built-in heat-sensitive substance, to sense different region of the temperature, and to display different color or odor through the chemical reaction; where the color displaying is same as the above procedure; while the odor diffusion is subject to the odor diffuser built in the display screen 11, and different concentration of odor represents a specific temperature region, for instance, a refreshing fragrance means the temperature is below 37° C., a medium fragrance specifies that the temperature is between 37° C.~39° C., and a dense fragrance represents the temperature is over 39° C., which specifies the degree of the measured temperature for the smeller. It hence shows that the display screen 11 could have multiple display modes, and the display screen can have a mono display mode, two or multiple display modes coexistent. As long as the display screen is capable of showing status of different temperatures is construed to be within the scope of the claim of this invention.

To assure the rectangular parallelepiped can be stuck long on the measured location, a structural combination with an attachment unit 20 is required. The attachment unit 20 is provided with a flat adhesive pad 21 for the attaching purpose, and an opening 22 is in its central portion, where the edge along the top side of the opening 22 is provided with gluey substance 23, and the gluey substance 24 is also placed at the bottom side of the adhesive pad 21 for the attachment; the depth of the joining fringe 31 is roughly equivalent to the thickness of the adhesive pad 21. During assembly, the joining fringe 31 is stuck firmly to the adhesive pad 21 by means of the effect of the gluey substance 23, which also enables the downward exposure of the bottom side of the sense unit 30 through the opening 22, and a protective pad 25 is attached to the bottom side of the adhesive pad 21; the protective pad 25 is stuck by the gluey substance 24 for temporary attachment, for the protection of the gluey substance 24 from contacting with air. When using, simply tear down the protective pad 25 and the exposed gluey substance 24 is ready to stick to wherever location to be attached (for instance: the forehead of a fevered patient, or any measured location of an individual body).

The protective pad 25 could be a single whole piece, which is stuck at the bottom side of the adhesive pad 21 and the sense unit 30; it could be made of two pieces, which are stuck at the both ends of the bottom side of the adhesive pad by the gluey substance 24, and crossed over below the bottom side of the sense unit 30. In the exemplified embodiment, the protective pad 25 is a two-piece type (shown in FIGS. 3 & 7), but not excluding the possibilities of being a mono-piece type or multiple-piece type over two pieces, which are all within the scope of the claim of this invention.

Figure 7:
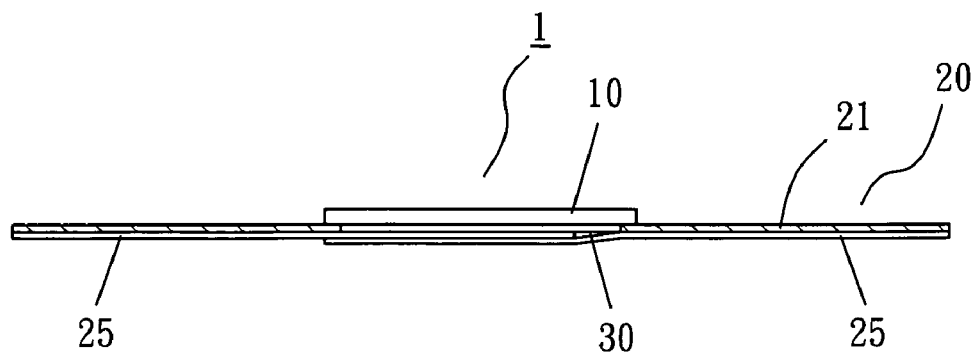
FIG. 7 is a side view of the exemplified embodiment of the present invention.
Figure 8:
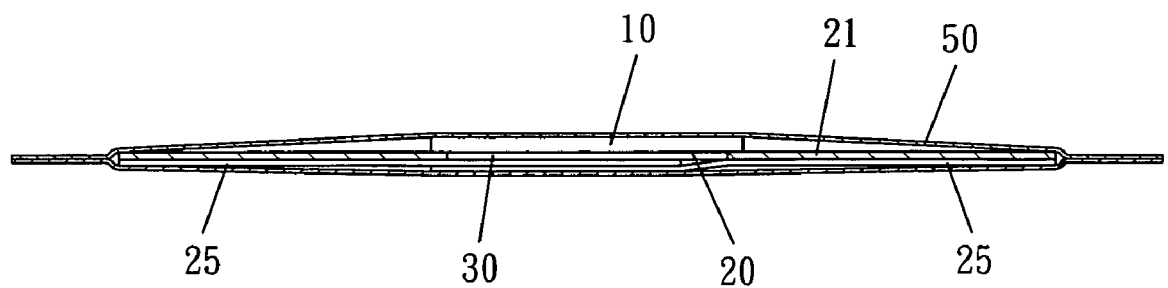
FIG. 8 is a schematic diagram of the packing of the exemplified embodiment of the present invention.

Once the rectangular parallelepiped integrated by the display unit 10 and the sense unit 30 is further combined with the attachment unit 20, shown in FIGS. 3 & 7, the gluey substance 23 is used to stick the rectangular parallelepiped which has avoided the air contact, while the gluey substance 24 is covered by the protective pad 25 temporarily, also avoiding the air contact; the rectangular parallelepiped is provided with electric power setup (for instance: thin battery cell), for powering the sense unit 30 and the display unit 10, where the switch 12 is for power-on/off of the power setup. The structure of the switch 12 is preferred to be somewhat concave, for the prevention of being touched by any article. As production is done, it's better to be packed by a plastic protective packing 50 (shown in FIG. 8).

Figure 9:
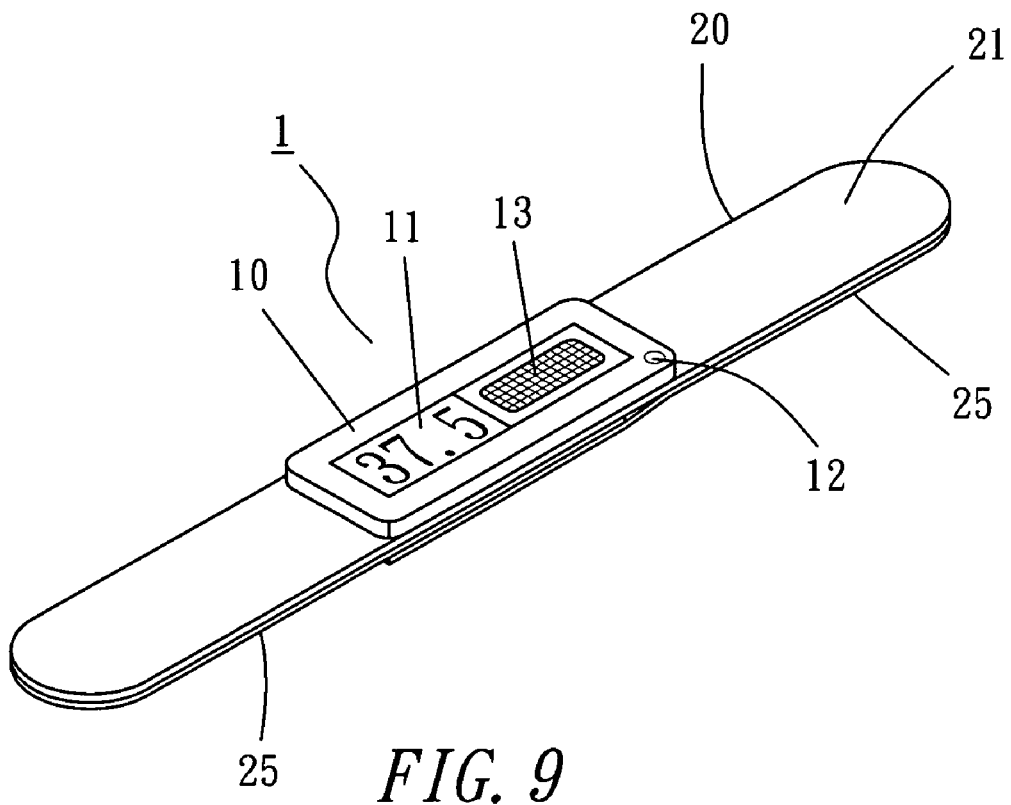
FIG. 9 is a three-dimensional view of the second exemplified embodiment of the present invention.
Figure 10:
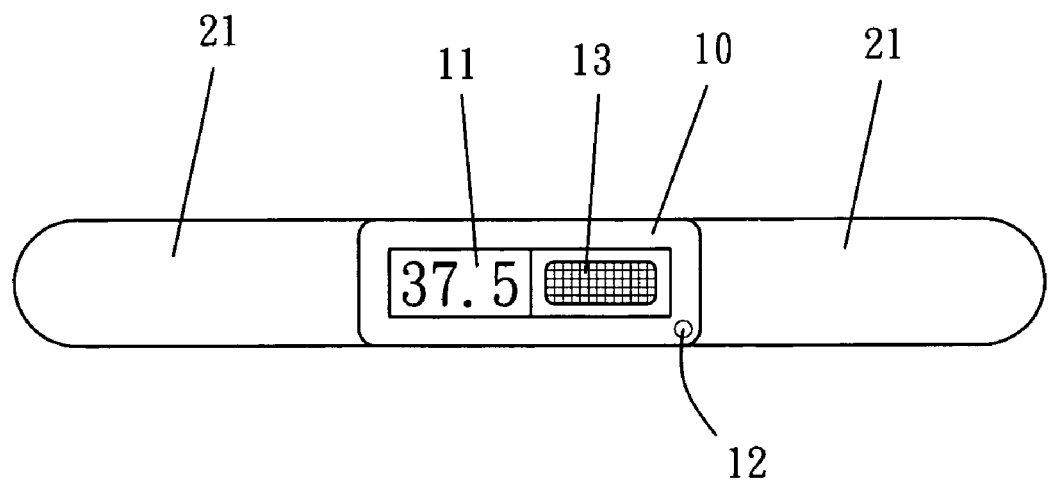
FIG. 10 is a top view of the second exemplified embodiment of the present invention.

Referring to FIGS. 9 & 10, the second exemplified embodiment of the present invention is an adhesive thermometer too, having a structure mostly same as the first exemplified embodiment, and the equivalence are not reiterated herein. The difference lies in an extra sound generator 13 which uses sound to represent measured temperature aside from the numeral, color or odor to represent the measured temperature on the display screen 11 of the display unit 10 at the top portion of the rectangular parallelepiped. The sound generator 13 gives off certain sound subject to the temperature of some region, for example: a soft and light voice to announce the numeral or a soft and light sound (for instance: "Ding", one sound), for the measured temperature below 37° C., and every announcement is arranged for a relatively long interval (for instance: 5 minutes); a solemn but light voice to announce the numeral or a haste sound (for instance: "Ding, Ding", two sounds) for the measured temperature between 37° C. and 39° C., and every announcement is arranged for a relatively short interval (for instance: 3 minutes); a more solemn but still light voice to announce the numeral or a more haste sound (for instance: "Ding, Ding, Ding", three sounds) for the measured temperature over 39° C., and every announcement is arranged for a relatively shorter interval (for instance: 1 minute).

An example of using the present invention is taking care for a fevered patient. The caretaker (for instance: the parents of the children) buys this product, and tears off the protective packing 50 to have the thermometer 1 of this invention, followed by tearing down the protective pad 25 to expose the gluey substance 24 for the attachment, and it is then ready for being stuck to the forehead of a patient (it's better to stick to the forehead, but not limit to any location of body, for instance: the chin). As the sense unit 30 is stuck to the forehead of a patient, followed by turning on the switch 12 for activating the sensing effect of the sense unit 30, the displaying effect (numeral, color or odor) of the display screen 11 of the display unit 10 and the vocalizing effect of the sound generator 13, which enables the real-time monitoring of the temperature of the patients. Therefore, the caretaker doesn't need to repeat the procedure of measuring the temperature again and again, whatever need is just through the sense of sight, the sense of smell and the sense of hearing, to recognize the updated status of the temperature of the patient, for taking any needed action, which is truly handy. Of course, aside from the use of the adhesive thermometer 1 of this invention, an extra temperature measurement at the inside of ear, armpit, the bottom of tongue or anus for the double check, would get remarkable outcomes for taking care of the patients. No matter how to use, this invention is capable of being firmly stuck on the forehead (or other location) of a patient, for a long time and real-time monitoring of the temperature variation, and represents the measured temperature by way of the numeral, color or odor on the display screen 11 of the display unit 10 or through the sound generator 13 to represent the measured temperature. This is superior to the entire prior art electronic thermometers which can not accomplish the aforementioned functioning.

The adhesive thermometer 1 of this invention is not limited for the use to human body (or animal), and other usages, for example: the demand for the temperature measurement of the chemical reaction in a beaker, and this invention can be stuck on the outer of the article for a long time temperature measurement; and other example: the demand for the temperature measurement of an inspection, and the adhesive thermometer 1 of this invention can be used for its sticky traits to be stuck on the inspected location or on the article for the temperature measurement. When this invention is used in non-human body applications, the temperature range corresponding to each showing icon: numeral, color or odor and/or the sound by the sound generator 13 varies from time to time, which is an indispensable alteration in the fabrication, and is construed as within the scope of the claim of this invention.

A note worth to mention is that the sense unit 30 and the display unit 10 are not inevitable to consume the electric power, for instance, as in the forgoing, the sense unit stuck on the measured article can sense the temperature immediately, transmit to the internal of the rectangular parallelepiped for the recognition of the certain color or odor corresponding to the temperature by the sensed materials, and exhibit the outcome, which is the operation that won't consume electric power, that means the setup of the electric power is not inevitable.

Accordingly, the present invention is intended for the improvement of the currently prior art electronic thermometers on their lacking of the structure and using mode for being stuck on the human body or on an article; therefore, an adhesive thermometer is designed for easy sticking on the measured location, which is a whole integral piece that can be stuck on the human body or an article, and can exhibit the measured temperature directly on the display screen and/or the sound mode by the sound generator, which absolutely cannot be accomplished by the entire prior art electronic thermometer. Therefore, the present invention is not only novel in its structural combination, but useful and creative in the functioning of the use, thereby filing the present application herein subject to the patent law. The aforesaid are the exemplified embodiments of the present invention, where the scope of the claim of the present invention is not intended to be limited by the embodiments. Any equivalent embodiments or modifications without departing from the spirit and scope of the present invention are therefore intended to be embraced.

What is claimed is:

1. An adhesive thermometer, comprising:
    a) a sense unit, for sensing a temperature of a measured location;
    b) a display unit, for showing the temperature measured by said sense unit, and joining said sense unit into a rectangular parallelepiped; and
    c) an attachment unit, for integrating with the rectangular parallelepiped, said sense unit being located beneath the display unit, said attachment unit being provided with an adhesive pad, once the adhesive pad is combined with the rectangular parallelepiped, said sense unit being disposed for exposure downward, and the bottom of the adhesive pad being provided with a gluey substance for attaching the adhesive pad adjacent the measured location thereby causing the sense unit to be seamlessly contacted with the measured location,
    wherein an edge of a bottom side of said sense unit is indented to form a joining fringe, the adhesive pad of said attachment unit is provided with an opening, a top edge along the opening has the gluey substance such that the joining fringe of the sense unit adheres to the top edge along the opening on the adhesive pad, and said sense unit is exposed downward through the opening.

2. An adhesive thermometer as in claim 1 wherein the adhesive pad is provided with a protective pad at its bottom, which is to prevent the gluey substance from exposure to the air, and the removal of the protective pad being needed when using.

3. An adhesive thermometer as in claim 2 wherein the protective pad is a single piece, which is stuck at the bottom side of the adhesive pad and said sense unit.

4. An adhesive thermometer as in claim 2 wherein the protective pad is made of two pieces, which are stuck at both ends of the bottom side of the adhesive pad and crossed over below the bottom side of said sense unit.

5. An adhesive thermometer as in claim 2 wherein the protective pad is made of multiple pieces, which are stuck at the bottom side of the adhesive pad and said sense unit.

6. An adhesive thermometer as in claim 1 wherein the display unit is provided with a display screen which shows the temperature sensed by said sense unit in terms of numerals and/or states.

7. An adhesive thermometer as in claim 6 wherein the display unit is provided with a sound generator which generates sound to represent the temperature sensed by said sense unit.

8. An adhesive thermometer as in claim 6 wherein the display unit is provided with an odor diffuser which diffuses odor to represent the temperature sensed by said sense unit.

* * * * *